Jan. 6, 1953 H. R. GRAYBILL 2,624,148
GUN TRAP AND SAFETY SETTING DEVICE
Filed Feb. 15, 1947
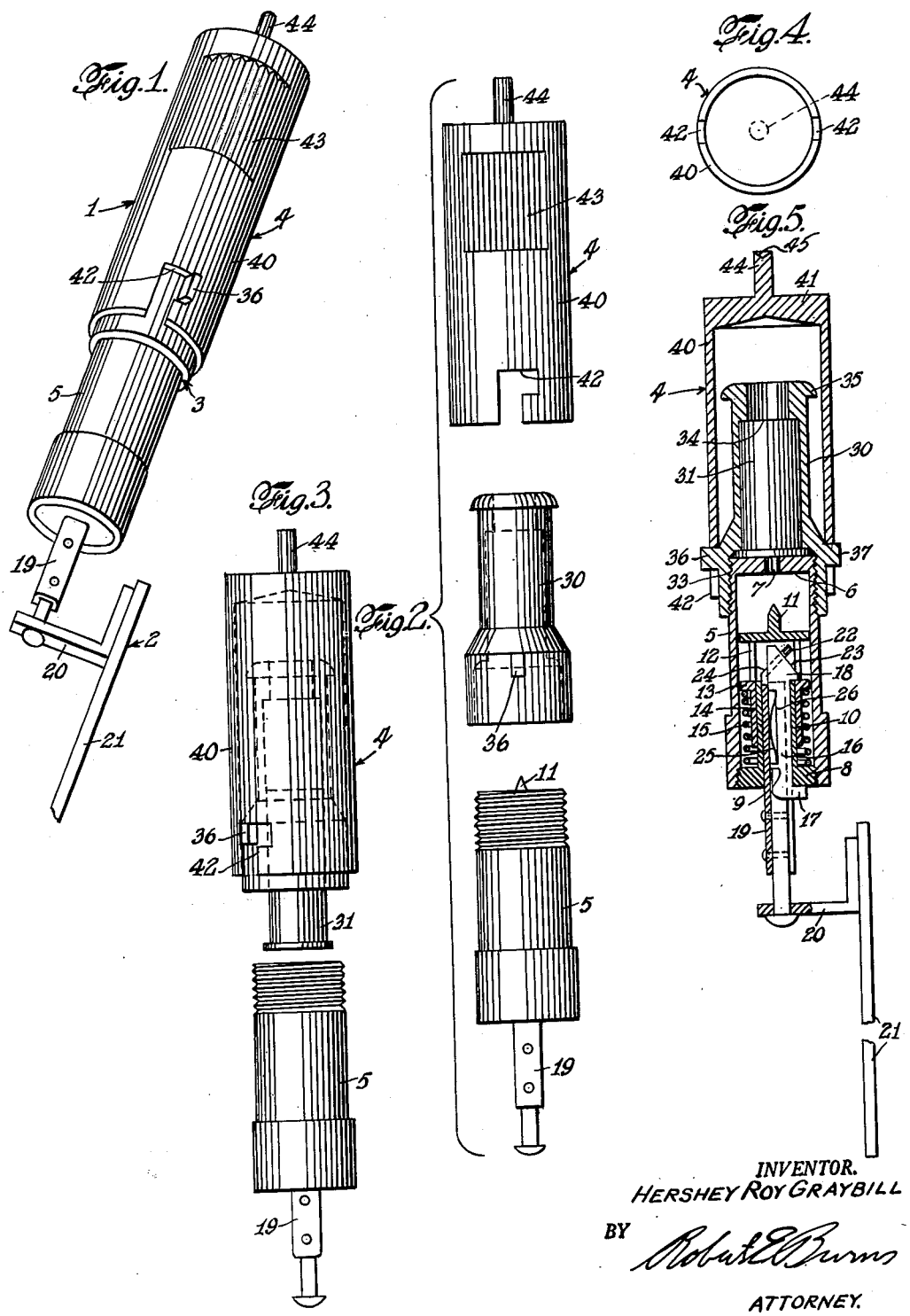
INVENTOR.
HERSHEY ROY GRAYBILL
BY
ATTORNEY.

Patented Jan. 6, 1953

2,624,148

UNITED STATES PATENT OFFICE 2,624,148

GUN TRAP AND SAFETY SETTING DEVICE

Hershey Roy Graybill, Manheim, Pa., assignor to Animal Trap Company of America, Lititz, Pa., a corporation of Pennsylvania Application February 15, 1947, Serial No. 728,887

5 Claims. (Cl. 43—84)

This invention relates to traps, and more particularly to a trap gun having safety setting means.

A gun trap is used for destroying certain predatory animals, for example, coyotes and wolves, by explosively discharging poison or other chemicals into the mouth of the animal springing the trap. The posion and the propelling charge are preferably contained in a cartridge somewhat similar to the usual gun cartridge, the trap being provided with a chamber into which the cartridge is inserted, a firing pin for discharging the cartridge, and trigger mechanism for releasing the firing pin. In use, the trap is driven or buried in the ground with only a small part projecting to which the bait is attached. The bait holding portion is connected with the trigger mechanism in such a manner that when the bait is seized by an animal, the firing pin is released, discharging the cartridge into the mouth or face of the animal. It can readily be seen that the setting of such gun traps, loaded with a poison such as cyanide is a hazardous operation unless carefully performed.

Trap guns have been heretofore made having safety devices to prevent the gun from firing accidentally. In many respects, such devices have been similar to those generally used on fire arms. It has been found that the safety devices are not foolproof and their failure to work properly has resulted in danger to persons handling the guns. It has been the practice to enclose the safety device within the structure of the gun and thus a person operating the gun has been unable to see if the safety device was working properly. In other cases, continued use of the safety devices has resulted in wearing of the parts so that the safety finally became useless. Another disadvantage of prior devices is that the safety has been so positioned on the trap that it is generally buried when the trap is placed in a camouflaged set. It is thus difficult to find and actuate the safety if the trap is to be removed or moved to a new location.

The present invention aims to overcome the foregoing difficulties by providing means which makes the trap setting operation safe by protecting the trapper from the charge should the gun be fired accidentally. In accordance with the invention, this is accomplished by providing a gun trap with removable means for retaining the exploded charge within the device and gradually dissipating the excess gases in the direction of the ground and thus away from the trapper.

An object of the invention is to provide a safety gun trap which is easy to operate and economical to manufacture. Another object of the invention is to provide a safety gun trap which during the setting thereof gives a visual indication that the safety is in position even though the gun trap may be in set position in the ground.

A safety gun trap in accordance with the invention is advantageous in that there is no complicated mechanism to get out of adjustment. The safety may be used on all gun traps of this general type and may even be attached to a baited gun trap. The use of a separable safety device is economical inasmuch as one safety device may be used for any number of traps while a built-in safety device is effective only with the trap in which it is installed.

Other objects and advantages of the invention will be apparent from the following description and from the accompanying drawings which show, by way of example, an embodiment of the invention.

In the drawings:

Fig. 1 is a perspective view of a safety gun trap in accordance with the invention showing the safety device in position over the muzzle of the trap.

Fig. 2 is a side view of the parts of the trap aligned in position for assembly.

Fig. 3 is a view corresponding to Fig. 2 with the safety device attached to the muzzle portion of the trap and with a cartridge partly in the chamber.

Fig. 4 is an end view of the open end of the safety device.

Fig. 5 is a longitudinal sectional view of the gun trap with the safety device in position.

Referring to the drawing, there is shown a safety gun trap 1, in accordance with the invention, comprising an anchoring connection 2 for securing the trap in position in the earth, and a gun trap 3 equipped with a safety device 4 for retaining an accidental discharge of the gun and dissipating the charge into the ground.

The mechanism of the gun trap 3 is described in more detail and claimed in my co-pending United States application, Serial No. 631,017, filed November 27, 1945, now Patent No. 2,575,515. The basic member of the gun is a hollow cylindrical casing or housing 5 which is closed at both ends. The upper end closure 6 of the housing 5 is adapted to form the bottom of the cartridge chamber of the gun. The breech 6 is provided with a firing pin opening 7. The lower end closure 8 of housing 5 is the bottom end of the gun and is provided with an opening 9 surrounded by an upwardly projecting tube 10. The closure 8 is threaded into the housing to permit assembly of the operating mechanism of the trap.

The operating mechanism for firing the explosive cartridge comprises a firing pin 11 having a downwardly projecting portion 12 seating on the top 13 of a flanged sleeve 14 guided for reciprocable movement between the inside of the housing 5 and the outside of tube 10. Helical compression spring 15 surrounds the sleeve 14 and acts between the top of the bottom closure 8 and the bottom of flange 13 of sleeve 14 to urge the sleeve and firing pin 11 upwardly into the discharged position.

The firing pin 11 is held in set position by a latching member 16 adapted to hold the spring 15 in compression. The latching member 16 has a projecting portion 17 engaging the bottom of closure 8, the upper part of the latching member forming another projecting portion or latch 18 engaging the top 13 of the flanged sleeve 14. The latching member is partially enclosed in a trigger member 19 positioned within tube 10 and attached at its lower end to the anchoring connection 2 which is formed of a bracket 20 attached to a stake 21. The trigger member 19 is of channel section and adapted to slidably fit within the tube 10. The upper end of the trigger member 19 is formed into a stirrup-like tripping portion 22 adapted to slide along an inclined surface 23 of the latching member 16. A slotted or cutaway portion 24 of the trigger member 19 provides space to receive the top end of the latching member 16 when the trap is tripped. A bow spring 25 is placed in a recessed portion 26 of the latching member 16 to normally urge the latch 18 in a clockwise or latched direction. However, it has been found that, if desirable, the bow spring 25 may be omitted.

At the upper end of housing 5 is attached a cartridge holder 30 which is adapted to receive a cartridge 31 and hold it in position against breech 6. The cartridge holder is removably secured to the housing 5 by threaded engagement of its lower threaded portion 33 with the upper end of the housing. The upper end 34 of the cartridge holder forms the muzzle of the gun trap. An external rim 35 provides means for retaining bait in position about the muzzle 34. Projecting ears 36 and 37 are either formed integrally with the lower end of the cartridge holder 30 or are attached by welding or the like, to provide means for attaching the safety device 4.

In accordance with the invention, the safety device 4 is provided to shield the trapper from an accidental discharge of the gun trap during the setting operation. The safety device is adapted to receive an accidental discharge and retains the charge within the device while permitting the excess gases to be dissipated away from the trapper. The safety device is formed of any suitable material such as plastic or metal and is in tubular form having a side wall 40 and end wall 41. The inner diameter of the safety device 4 is slightly greater than the outside diameter of the muzzle 34 so that the safety device loosely fits thereover. The length of the safety device is slightly greater than the length of the muzzle of the gun. Thus a chamber is formed adapted to receive the discharge from the gun while the excess gases are permitted to escape between the muzzle of the gun and the inner wall of the safety device. The lower end of side wall 40 is provided with L-shaped or bayonet slots 42 adapted to receive projecting arms 36 and 37 attached to the muzzle 34. The outer surface of the sidewall 40 may be formed with corrugated portion 43 to aid in obtaining a better grasp on the safety device. An extension 44 having a concave tip 45 is placed on the outside of end wall 41 of the safety device for use in setting the trap by depressing firing pin 11 through opening 7, the extension being of a diameter and length to accomplish this purpose, and the concave tip being provided so that the end of the firing pin will not slip off the end of the extension.

In setting a trap with a safety device the anchoring connection 2 is placed in the ground and the gun trap 3 attached to bracket 20. The muzzle is baited by wrapping cloth, wool or the like about the end of muzzle 34 and a suitable bait composition applied to the cloth or wool. Extension 44 is used to depress firing pin 11 which is automatically latched in the set position by latching member 16. The safety cap 4 is placed over the end of muzzle 34 and the cartridge 31 placed in the chamber. Muzzle 34 is then screwed into position over the upper end of housing 5 by rotating the safety cap 4 which protects the trapper against an upward discharge of the gun trap. The safety cap may then be removed.

From the preceding description it will be seen that the present invention provides a gun trap in which the setting operation is safe. The device is easy to operate and economical to manufacture. It is possible for the trapper to see whether or not the safety device is in position without touching or disturbing the trap.

While the invention has been described and illustrated with reference to a specific embodiment thereof, it will be understood that other embodiments may be resorted to without departing from the invention such as, for instance, the bayonet or L-shaped slots may be eliminated or formed in another shape, the outer wall may be shaped in a multi-sided surface, or the inner shape of the device may be varied. Therefore, the form of the invention set out above should be considered as illustrative and not as limiting the scope of the following claims.

What I claim and desire to secure by Letters Patent is:

1. In a gun trap of the type adapted to be partially buried in the earth, a tubular housing having an apertured upper end that is externally threaded, a firing mechanism in said housing including a firing pin adapted to project through an aperture in the upper end of the housing and a trigger extending outside the housing, an anchor adapted to be buried in the earth and connected to said trigger, a tubular cartridge chamber having an enlarged skirt portion at its lower end, said skirt portion being internally threaded to screw on the threaded upper end of the housing and having outwardly projecting protuberances on the exterior surface of the skirt and an inverted cup-shaped safety setting device fitting loosely over the cartridge chamber and having L-shaped notches in its lower edge adapted to receive said protuberances on the skirt portion of the cartridge chamber to turn said cartridge chamber by rotation of the setting device and releasably to hold the setting device against removal from the cartridge chamber in an axial direction, the interior of the setting device being hollow and being larger than the cartridge chamber to provide an explosion-suppression chamber.

between the upper end of the cartridge chamber and the upper end of the setting device and an annular explosion-suppression space between the side wall of the cartridge chamber and the side wall of the setting device.

2. In a gun trap of the type adapted to be partially buried in the earth, a tubular housing having an externally threaded, apertured upper end, a firing mechanism in said housing including a firing pin adapted to project through an aperture in the upper end of the housing and a trigger extending outside the housing, an anchor adapted to be buried in the earth and connected to said trigger, a tubular cartridge chamber having at its lower end an internally threaded skirt portion adapted to screw on the threaded upper end of the housing and having outwardly projecting protuberances on the exterior surface of the skirt and an inverted cup-shaped safety setting member fitting loosely over the cartridge chamber and having L-shaped recesses at its lower end adapted to receive said protuberances to provide a bayonet-type connection between the setting member and the cartridge chamber, said setting member having a cylindrical side wall and an integral end wall at its upper end and being hollow with an interior space larger than the cartridge chamber to provide an empty explosion-suppression chamber between the upper end of the cartridge chamber and the closed upper end of the setting member and an empty annular explosion-suppression space between the side wall of the cartridge chamber and the side wall of the setting member.

3. In a gun trap of the type adapted to be partially buried in the earth, a tubular housing having an externally threaded upper end and apertures at its upper and lower ends, a firing mechanism in said housing including a firing pin adapted to project through an aperture in the upper end of the housing and a trigger extending out through an opening at the lower end of the housing, an anchor adapted to be buried in the earth in a position offset laterally from the housing, connections between the anchor and the trigger, a tubular cartridge chamber having at its lower end an internally threaded skirt portion adapted to screw on the threaded upper end of the housing and having outwardly projecting protuberances on the exterior surface of the skirt and an inverted cup-shaped safety setting member fitting loosely over the cartridge chamber and having L-shaped recesses at its lower end adapted to receive said protuberances to provide a bayonet-type connection between the setting member and the cartridge chamber, said setting member having a cylindrical side wall and an end wall closing its upper end and being hollow with an interior space larger than the cartridge chamber to provide an empty explosion-suppression chamber between the upper end of the cartridge chamber and the closed upper end of the setting member and an empty annular explosion-suppression space between the side wall of the cartridge chamber and the side wall of the setting member.

4. In a gun trap of the type adapted to be partially buried in the earth, a tubular housing having an externally threaded apertured upper end, a firing mechanism in said housing including a firing pin adapted to project through an aperture in the upper end of the housing and a trigger extending outside the housing, an anchor adapted to be embedded in the earth and loosely connected to said trigger, a tubular cartridge chamber having an enlarged skirt portion at its lower end and an outwardly projecting rim at its upper end, said skirt portion being internally threaded to screw on the threaded upper end of the housing and an inverted cup-shaped safety setting member fitting loosely over the cartridge chamber and having a cylindrical side wall and an end wall closing its upper end, the lower portion of said setting member and the sleeve at the lower end of the cartridge chamber having interengaging portions to provide a bayonet-type joint between the setting member and the cartridge chamber, said setting member being hollow with an interior space substantially larger than the cartridge chamber in both an axial and radial direction to provide an empty explosion-suppression chamber between the upper end of the cartridge chamber and the closed upper end of the setting member and an empty annular explosion-suppression chamber between the side wall of the cartridge chamber and the side wall of the setting member, said explosion-suppression chambers communicating with one another through an annular passageway attenuated by the outwardly projecting rim at the upper end of the cartridge chamber.

5. In a gun trap of the type having its firing pin chamber, cartridge chamber and trip means with their longitudinal axes all in alignment, an anchoring means having a portion thereof adapted to be anchored in the ground, said portion having its major axis out of alignment with the said axes, means loosely connecting said trip means with said anchoring means, and a cover for said cartridge chamber constituting a safety setting device, said cover being applicable by a longitudinal movement and then rotation about said longitudinal axes and said cover having a rotatable bayonet locking connection with said cartridge chamber, whereby rotation of the cover to secure it to the cartridge chamber will not be effective to cause rotation of the said portion of the anchor to rotate about the same axis.

HERSHEY ROY GRAYBILL.

REFERENCES CITED

The following references are of record in the file of this patent:

UNITED STATES PATENTS

| Number | Name | Date |
| --- | --- | --- |
| 656,210 | Meredith | Aug. 21, 1900 |
| 1,136,432 | Northland | Apr. 20, 1915 |
| 1,348,543 | Crockett | Aug. 3, 1920 |
| 1,478,610 | Kraft | Dec. 25, 1923 |
| 2,456,957 | Kock et al. | Dec. 21, 1948 |

FOREIGN PATENTS

| Number | Country | Date |
| --- | --- | --- |
| 14,973 | Great Britain | of 1915 |
| 31,288 | Sweden | Aug. 5, 1911 |
| 321,148 | Germany | May 21, 1920 |